United States Patent
Holly et al.

(10) Patent No.: US 11,858,311 B2
(45) Date of Patent: Jan. 2, 2024

(54) ENVIRONMENTAL CONTROL DEVICE MOUNTING FRAME

(71) Applicant: Walmart Apollo, LLC, Bentonville, AR (US)

(72) Inventors: Morgan M. Holly, Rogers, AR (US); Blake Andrew Baldwin, Cave Springs, AR (US); Jeff Knappenberger, Bella Vista, AR (US); Andrew Trinkle, Bella Vista, AR (US)

(73) Assignee: Walmart Apollo, PLLC, Bentonville, AR (US)

( * ) Notice: Subject to any disclaimer, the term of this patent is extended or adjusted under 35 U.S.C. 154(b) by 436 days.

(21) Appl. No.: 17/242,618

(22) Filed: Apr. 28, 2021

(65) Prior Publication Data

US 2021/0339602 A1   Nov. 4, 2021

Related U.S. Application Data

(60) Provisional application No. 63/017,115, filed on Apr. 29, 2020.

(51) Int. Cl.
*B60H 1/00* (2006.01)
*B60Q 3/56* (2017.01)

(52) U.S. Cl.
CPC ..... *B60H 1/00535* (2013.01); *B60H 1/00014* (2013.01); *B60Q 3/56* (2017.02)

(58) Field of Classification Search
CPC .. B60H 1/00535; B60H 1/00014; B60Q 3/00; B60Q 3/30; B60Q 3/40; B60Q 3/50;
(Continued)

(56) References Cited

U.S. PATENT DOCUMENTS 4,236,194 A * 11/1980 Norman ................ E02F 9/0858
                                                    362/384
4,658,335 A *  4/1987 Culler ..................... B60Q 1/305
                                                    362/369
(Continued)

FOREIGN PATENT DOCUMENTS

BR           7600788 U   *  7/1998
BR    202012021035 U2   * 12/2014
(Continued)

*Primary Examiner* — Lori Lyjak
(74) *Attorney, Agent, or Firm* — Barta, Jones & Foley, PLLC

(57) ABSTRACT

Examples provide an attachment frame for combination attachment of environmental control devices. A plurality of non-articulating, rigid segments within a main body bend at various fixed angles. A perpendicular support arm forms an "L-shaped" attachment at the top of the main body. The support arm mounts one or more lights which attach to a top surface of the support arm. A bottom surface of the support arm mounts a fan or heater above a conveyor or other work area. The attachment frame includes a container holder to hold a water bottle or other container. A mounting plate connected to segment at the bottom of the main body mounts to the trailer conveyor device or other equipment. The attachment frame provides light, ventilation and/or temperature control for users working within an interior of a trailer or other confined spaces.

20 Claims, 18 Drawing Sheets

(58) Field of Classification Search
CPC .... B60Q 3/51; B60Q 3/56; B60Q 3/59; F21S 8/00; F21S 8/03; F21S 8/043; F21S 8/036
See application file for complete search history.

(56) References Cited

U.S. PATENT DOCUMENTS

| | | | |
|---|---|---|---|
| 4,973,016 A | 11/1990 | Hertenstein | |
| 5,709,458 A | 1/1998 | Metz | |
| 6,183,203 B1* | 2/2001 | Grintz | F16M 11/2014 |
| | | | 416/246 |
| 6,409,367 B1* | 6/2002 | Pratt | F21V 21/14 |
| | | | 340/471 |
| 7,481,554 B2* | 1/2009 | Anderson | F21L 4/04 |
| | | | 362/411 |
| 7,823,239 B2* | 11/2010 | Hochstein | B65G 69/287 |
| | | | 14/71.1 |
| 8,714,769 B2* | 5/2014 | Cristoforo | F21V 21/084 |
| | | | 362/396 |
| 8,807,814 B1 | 8/2014 | Glenn | |
| 9,151,311 B2 | 10/2015 | Baek, IV et al. | |
| 9,255,699 B2* | 2/2016 | Wiegel | H05B 47/115 |
| 9,637,064 B1* | 5/2017 | Kuehnle | G03B 17/561 |
| 10,343,778 B2* | 7/2019 | Peuziat | F16M 11/14 |
| 11,041,641 B2* | 6/2021 | Markert | F24F 1/0022 |
| 11,215,346 B2* | 1/2022 | Wiegel | F04D 27/00 |
| 11,739,924 B2* | 8/2023 | Wiegel | F21V 21/28 |
| | | | 362/96 |
| 2008/0184835 A1* | 8/2008 | Breidenbach | B62D 35/004 |
| | | | 74/469 |
| 2015/0159999 A1* | 6/2015 | Morrow | A61B 6/102 |
| | | | 356/614 |
| 2019/0350136 A1 | 11/2019 | Craig | |
| 2021/0339602 A1* | 11/2021 | Holly | B60Q 3/56 |

FOREIGN PATENT DOCUMENTS

| | | | | |
|---|---|---|---|---|
| CA | 2798987 A1 * | 6/2013 | | G01R 15/04 |
| CN | 2198187 Y * | 5/1995 | | |
| CN | 108548121 A * | 9/2018 | | F21S 8/00 |
| CN | 107504397 B * | 11/2019 | | F21S 8/00 |
| CN | 110397872 A * | 11/2019 | | |
| CN | 212590755 U * | 2/2021 | | |
| CN | 113294386 A * | 8/2021 | | |
| CN | 113598963 A * | 11/2021 | | |
| CN | 214581333 U * | 11/2021 | | |
| CN | 217999773 U * | 12/2022 | | |
| DE | 102017217219 A1 * | 3/2019 | | B60Q 3/54 |

* cited by examiner

ENVIRONMENTAL CONTROL DEVICE MOUNTING FRAME

BACKGROUND

Goods are frequently transported in trailers which do not include light fixtures, natural light sources or means for ventilation apart from the main trailer doors, which can be opened to permit only limited lighting and air to enter the trailer. During loading and unloading of cases and pallets inside the trailer, users are frequently working in cramped areas in which temperatures can quickly climb to uncomfortable levels. The lack of sufficient lighting can make it difficult for users to read labels, identify items and correctly place items inside the trailer. Battery operated lights, such as flashlights, are insufficient as they fail to illuminate all areas, leaving dark zones due to poor light distribution and can hamper the users movements. Cords for non-battery powered lights or lamps within the trailer pose a safety hazard for users, as the cords can become tangled, trip users, or otherwise interfere with user movements. Moreover, fans or air conditioning units outside the trailer do not provide ventilation or lower temperatures in areas inside the trailer away from the doors. These solutions are inefficient and decrease safety of users performing tasks, such as loading and unloading goods, inside a trailer.

SUMMARY

Some examples provide an attachment frame for supporting environmental control devices. The attachment frame includes a substantially vertical main body comprising a plurality of non-articulating segments bending at a set of angles, the set of angles comprising an angle between each pair of segments within the main body. A support arm substantially perpendicular to the main body configured to support a set of environment control devices. The set of environmental control devices can include, for example but without limitation, one or more lights, one or more fans, one or more heaters, one or more air conditioners, or any other type of environmental control device. The support arm is connected to a first segment in the plurality of non-articulating segments associated with a first end of the main body. A mounting plate connected to a second segment in the plurality of non-articulating segments associated with a second end of the main body. The mounting plate removably attaches the attachment frame to a trailer conveyor device or other equipment within an interior of a trailer or other work area.

Other examples provide a method for combination attachment of environmental control devices via an attachment frame. The attachment frame is mounted to a member of a trailer conveyance device via a mounting plate. The attachment frame includes a plurality of non-articulating segments bending at a set of angles and a support arm substantially perpendicular to a top surface of the trailer conveyance device. A set of environment control devices is mounted to at least a portion of the support arm. The support arm is connected to a first segment in the plurality of non-articulating segments associated with a first end of a main body of the attachment frame. The environmental control device(s) are engaged to improve environmental conditions within an interior of a trailer during loading or unloading a set of items into an interior compartment within a trailer or other working area.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

Referring to the figures, examples of the disclosure enable an attachment frame for mounting environmental control devices, such as fans and lights within a work area, such as, but not limited to, the interior of a trailer. In some examples, the attachment frame enables secure mounting of lights, fans, heaters and/or other environmental control devices above a work area without obstructing movements of users moving and working within the area. This provides lighting and ventilation at the point of use for trailer loading to improve trailer loading efficiency and reduces heat-related issues.

Aspects of the invention provide environmental control devices, such as fans and lights, mounted on an attachment frame above a work area. The fan(s) and light(s) may be positioned to suit the user. This improves working conditions within a trailer to reduce heat and increase user comfort levels. The additional light further improves lighting to improve safety, increase quality of the environment, and reduce load quality issues.

Other aspects provide an attachment frame mounts to a loader device within an interior of a trailer piece of equipment to hang a light and/or fan above the loader. The attachment frame contributes to improved load quality in the trailers and reduces the impact of heat. In some examples, the system provides a lower heat index of approximately six degrees and a higher lighting level by about seventeen foot-candles, from one-foot candle of light provided by a battery-powered light to eighteen-foot candles (18 ft-candles) provided by light(s) mounted on the attachment frame. The light in other examples also provides a more diffuse light which doesn't tend to "blind" the loaders if they gaze in that direction.

Figure 1:
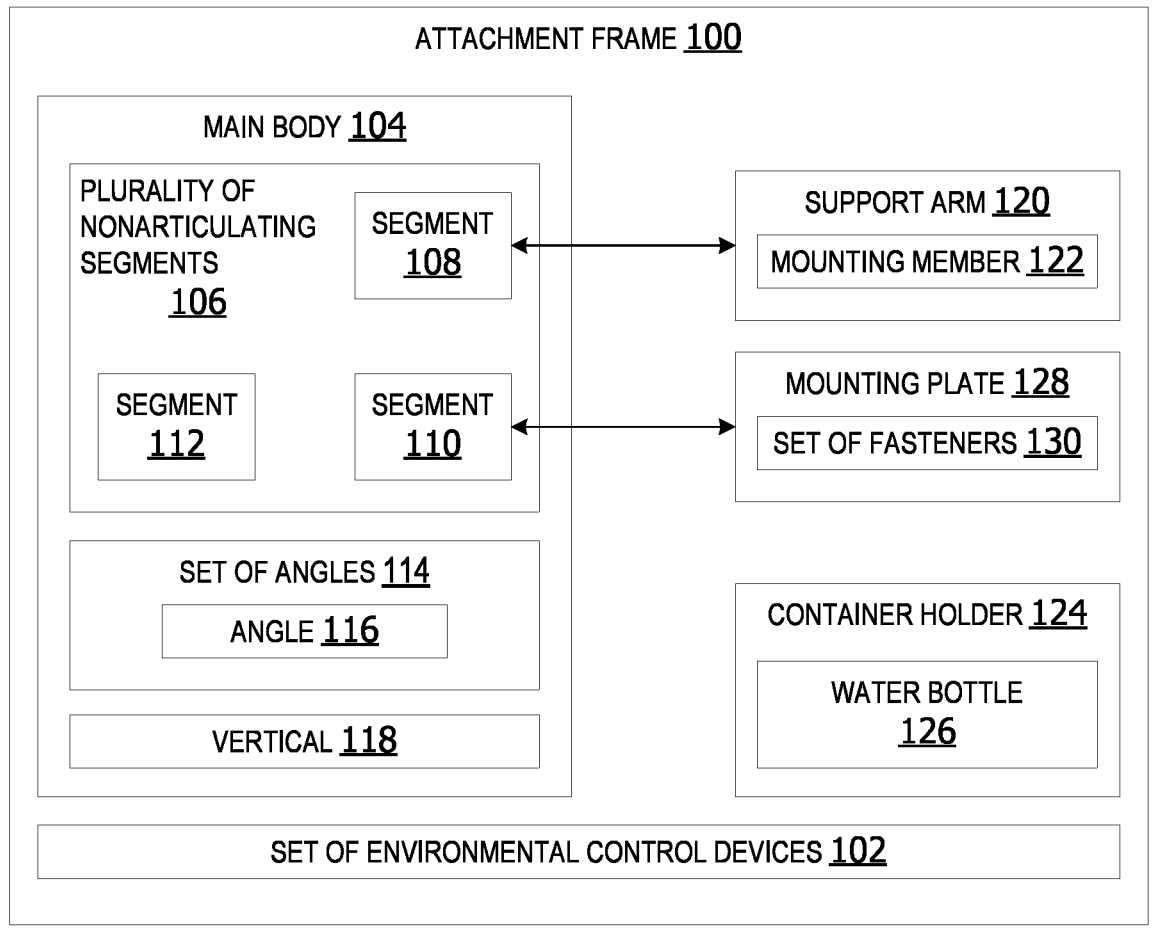
FIG. 1 is an exemplary block diagram illustrating a system for mounting environmental control devices to equipment via an attachment frame.

FIG. 1 is an exemplary block diagram illustrating a system including an attachment frame 100 for mounting a set of environmental control devices 102. The set of environmental control devices 102 includes one or more devices for controlling the environment within an interior of a trailer or other work area. A control device in the set of environmental control devices 102 can include, for example but without limitation, one or more fans, one or more lights, one or more heaters, one or more portable air conditioners, or any other type of environmental control device.

A main body 104 of the attachment frame 100 includes a plurality of non-articulating segments 106, such as, but not limited to, segment 108, segment 110 and/or segment 112. The main body 104 can be composed of any type of suitable material, such as, but not limited to, metal, plastic, a composite material, or any other material. In some examples, the main body 104 of the attachment frame 100 is composed of steel, galvanized steel, aluminum, or other suitable metal.

In the example shown in FIG. 1, the plurality of non-articulating segments 106 includes three segments. However, the examples are not limited to three segments. In other examples, the plurality of segments 106 includes two segments, as well as four or more segments. In some examples, the main body 104 includes a set of five non-articulating segments.

The plurality of non-articulating segments 106 bend at a set of angles 114. The set of angles 114 include an angle 116 between at least one pair of segments within the main body 104. In some non-limiting examples, there is an angle between every pair of segments in the plurality of non-articulating segments 106.

In some examples, a subset of the segments in the plurality of segments are substantially vertical 118, while another subset of the segments are bent at a fixed angle. In an example, a first segment 108 may be vertical while the next connecting segment is bent at an acute angle.

A support arm 120 substantially perpendicular to the main body is configured to support one or more devices in the set of environment control devices 102. The support arm is connected to a segment in the plurality of non-articulating segments associated with a first end of the main body 104, such as, but not limited to, the segment 108. In some examples, the support arm 120 and the segment 108 form a right angle.

In some non-limiting examples, a mounting member 122 associated with the support arm 120 is configured to removably attach at least one environmental control device to the attachment frame 100. The mounting member 122, in some examples, includes a fastener for securing the device to the attachment frame, such as, but not limited to, one or more clamps, one or more clips, one or more brackets, one or more bolts, one or more pins and/or one or more screws.

In other examples, the attachment frame 100 includes a container holder 124 connected to another segment of the main body, such as, but not limited to, the segment 112. The container holder 124 is configured to support a container for storing liquid, such as, but not limited to, a water bottle 126. In some examples, the container holder 124 is a plastic ring or partial ring, such as a cup holder. In other examples, the container holder 124 is a clamp or ring for supporting a bottle or cup.

The container holder 124 in this non-limiting examples is three and a half inches tall and four inches wide attached to a segment that is fourteen inches long. However, the examples are not limited to a container holder having these dimensions. In other examples, the container holder 124 can have different dimensions.

A mounting plate 128 in some examples is connected to a segment in the plurality of non-articulating segments, such as, but not limited to, the segment 110. The mounting plate 128 is configured to mount the attachment frame to a trailer conveyor device for loading or unloading a set of items within an interior of a trailer. In some examples, the mounting plate is associated with the bottom end of the attachment frame and connected to the last (bottom-most) segment. However, the examples are not limited to placing the mounting plate on the bottom (last) segment. In other examples, the mounting plate can be attached to any other segment on the attachment frame.

Figure 2:
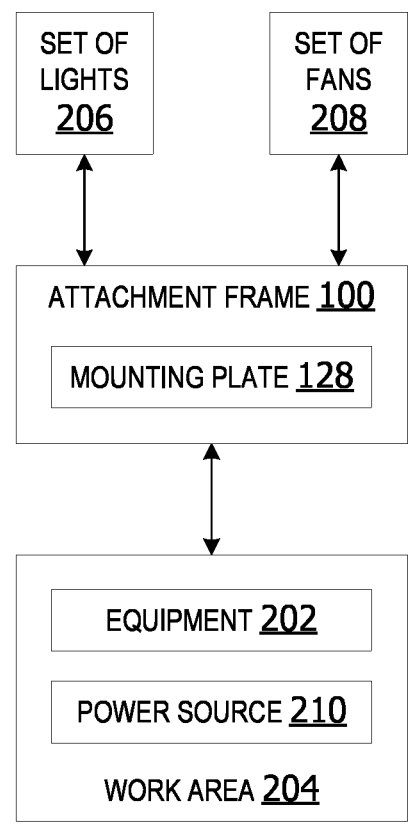
FIG. 2 is an exemplary block diagram illustrating an attachment frame mountable on a piece of equipment in a work area.

FIG. 2 is an exemplary block diagram illustrating an attachment frame 100 mountable on a piece of equipment 202 in a work area 204. The attachment frame 100 mounts to the equipment 202 via a mounting plate 128. The mounting plate is irremovably connected to a segment of the main body of the attachment frame. In some examples, the mounting plate 128 is welded to the segment of the attachment frame 100.

The equipment 202 is any type of equipment within a work area 204. In some non-limiting examples, the equipment 202 is a trailer conveyance device utilized within an interior of a trailer. In other examples, the equipment 202 can include a fixture within a trailer or other work area. In a non-limiting example, the attachment frame 100 attaches to the side of the equipment 202 bringing a light and fan overhead of the user working in a ship trailer.

The attachment frame 100 mounts a set of environmental control devices within the work area 204, such as, but not limited to, a set of one or more lights 206 and/or a set of one or more fans 208. In some examples, the attachment frame mounts the set of lights 206 and/or the set of fans at the top of the attachment frame 100. The mounting plate 128, in these examples, mounts the attachment frame to the equipment at or near the bottom end or lowest segment of the attachment frame.

The set of lights 206 can include any type of illumination device, such as, but not limited to, an incandescent light, a light emitting diode (LED) light, battery powered light, corded lamp, or any other type of light. The set of lights 206 provides additional illumination within the work area.

The set of fans 208 includes one or more fans mounted to the support arm. The set of fans provide additional ventilation within the work area. The fans circulate the air and assist with lowering the temperature within the trailer.

The work area in some examples includes a power source 210. The power source provides electrical power to electrical devices, such as, but not limited to, the set of environmental control devices 102. In some examples, the power source 210 is included within the equipment or trailer conveyance device.

Figure 3:
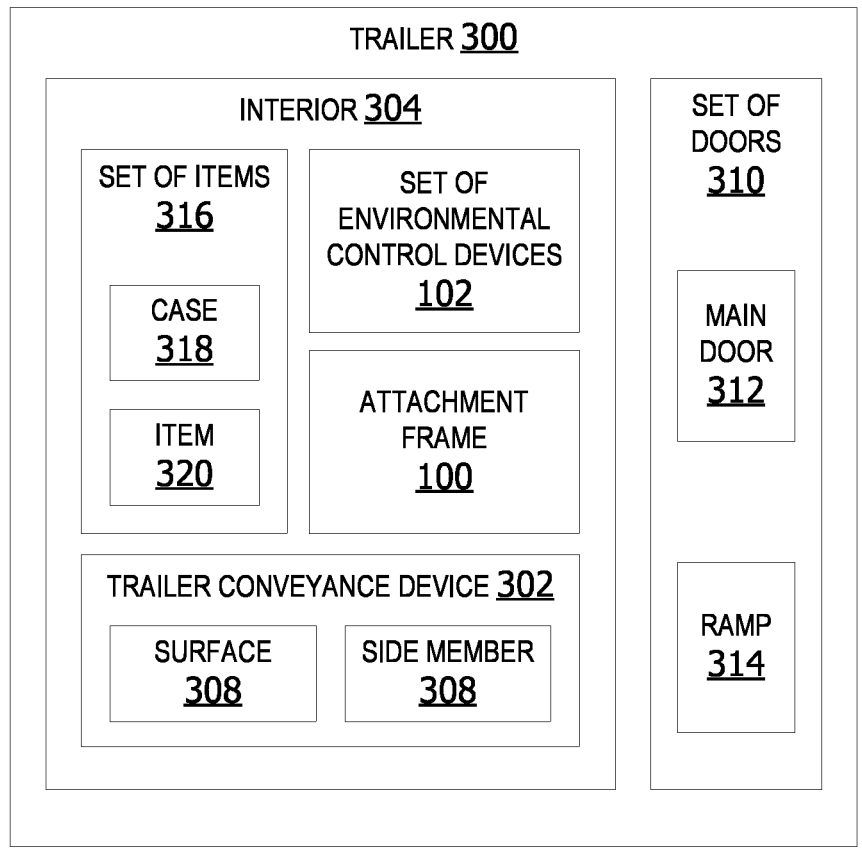
FIG. 3 is an exemplary block diagram illustrating an attachment frame within a trailer.

FIG. 3 is an exemplary block diagram illustrating an attachment frame 100 within a trailer 300. The attachment frame 100 mounts to a portion of a trailer conveyance device 302 within an interior 304 of the trailer 300. In some examples, the attachment frame 100 mounts to a portion of a side member 306 of the trailer conveyance device 302. The attachment frame 100 mounts the set of environmental control devices 102 above the surface 308 of the trailer conveyance device 302 within a work area inside the interior of the trailer 300.

The trailer 300 optionally includes a set of one or more doors 310 at one end of the trailer. The set of doors 310 include a main door 312. The trailer can also optionally include a ramp 314 used for loading and unloading a set of one or more items 316 into the interior 304 of the trailer 300. An item in the set of items 316 can include a case 318 and/or an individual item 320.

Figure 4:
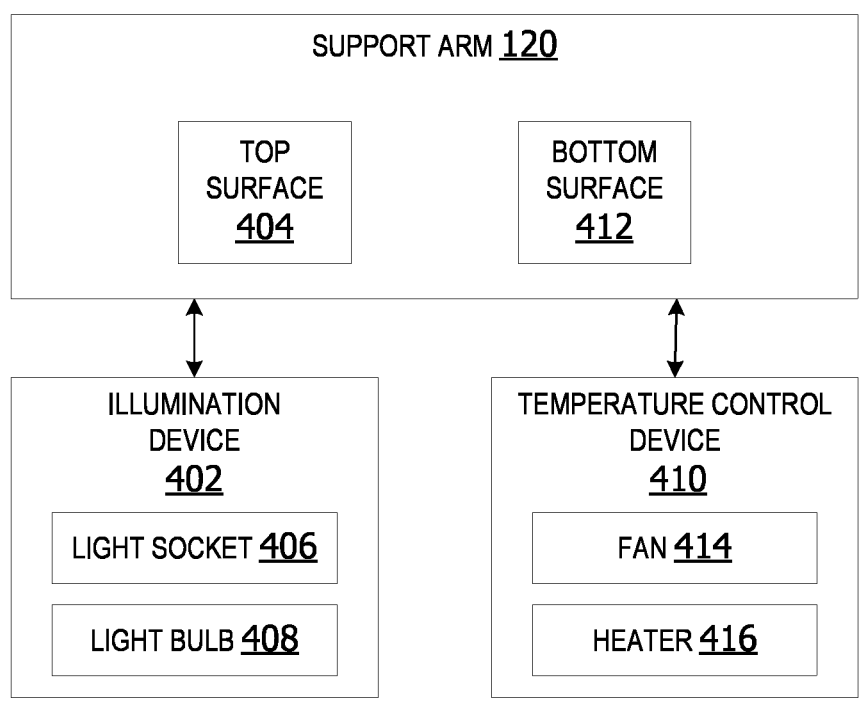
FIG. 4 is an exemplary block diagram illustrating a support arm.

FIG. 4 is an exemplary block diagram illustrating the support arm 120. In some examples, the support arm 120 mounts an illumination device 402 to a top surface 404 (upper surface) of the support arm 120. The illumination device 402 is a device for providing light, such as, but not limited to, a device in the set of lights 206 in FIG. 2. In some examples, the illumination device 402 includes a light socket 406 which provides electrical connections and electrical power to a light bulb 408.

In other examples, a temperature control device 410 removably mounts to a bottom surface (underside) of the support arm 120. The temperature control device 410 is a device for circulating air or changing temperature within trailer or other work area, such as, but not limited to, a fan in the set of fans 208 in FIG. 2. The temperature control device 410 can include a fan 414 or a heater 416. In other non-limiting examples, the temperature control device 410 can include an air conditioner, humidifier, de-humidifier, mister, air purifier, ionizer, or any other type of environmental control device.

The fan 414 in some examples includes a set of rotatable blades for circulating or moving air. The fan 414 can include a stationary fan, a rotating fan, a portable fan, an exhaust fan, or any other type of fan capable of being mounted to the support arm 120. In a non-limiting example, the fan 414 is a twelve-inch multi-speed fan.

Figure 5:
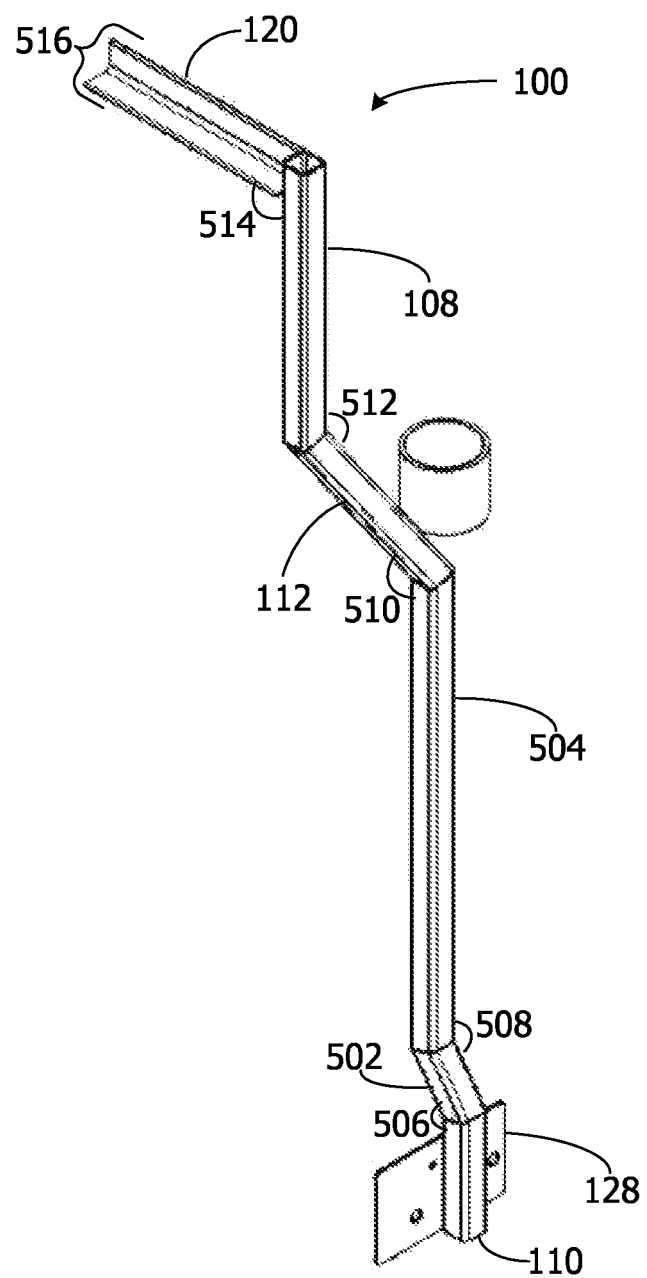
FIG. 5 is an exemplary block diagram illustrating an attachment frame.

FIG. 5 is an exemplary block diagram illustrating an attachment frame 100. The attachment frame 100 in this example includes a set of five segments. The mounting plate 128 is connected to a segment 110. In some non-limiting examples, the segment 110 is a square tube having a length of approximately six and a half inches and a width of one and a half inches.

In other examples, a segment 502 connects to the segment 110 and bends at an angle 506. The segment 502, in some examples, is implemented as a square tube having a length of four inches and a width of approximately one and a half inches.

A segment 504 connects to the segment 502 and forms an angle 508. The segment 504 rigidly connects to the segment 112, creating an angle 510. The segment 108 connects to the segment 112, forming an angle 512. In some non-limiting examples, the segment 108 is implemented as a substantially hollow, square tube having a length of fifteen inches, a width of one and a half inches.

A container holder 124 attaches to the segment 112. In some non-limiting examples, the segment 112 is fourteen and a half inches in length with a width of one and a half inches.

The segment 108 connects to the support arm 120 at a right angle 514. The support arm 120 forms an L-shaped 516 member for mounting one or more environmental control devices, such as, but not limited to, the set of lights 206 in FIG. 2, the set of fans 208 in FIG. 2, the illumination device 402 in FIG. 4 and/or the temperature control device 410 in FIG. 4.

In some non-limiting examples, the segment 504 is implemented as a square tube having a length of approximately twenty-five inches. In one example, the segment 504 is twenty-five and fifteen sixteenths inches long. The segment 504 in other non-limiting examples is one and a half inches wide.

Figure 6:
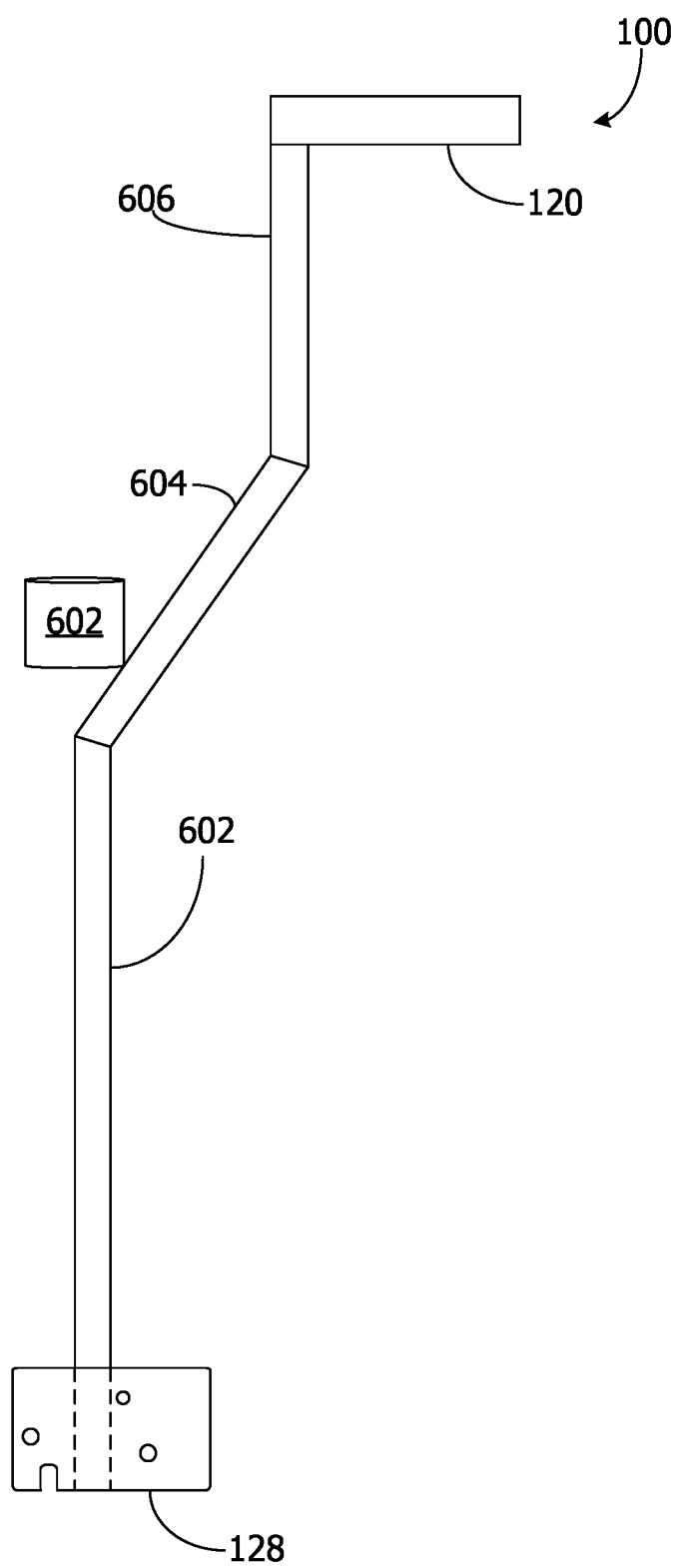
FIG. 6 is an exemplary block diagram illustrating an attachment frame including a cup holder.

FIG. 6 is an exemplary block diagram illustrating an attachment frame 100 including a cup holder 602. The cup holder 602 is a holder for supporting a water bottle, a cup or other container, such as, but not limited to, the container holder 124 in FIG. 1.

The attachment frame 100 includes a set of rigid segments, such as, but not limited to, the plurality of non-articulating segments 106 in FIG. 1. In this example, the attachment frame includes a first segment connected to the mounting plate 128, a second segment 604 including the cup holder 602 and a third segment 606 to which the support arm 120 is attached.

Figure 7:
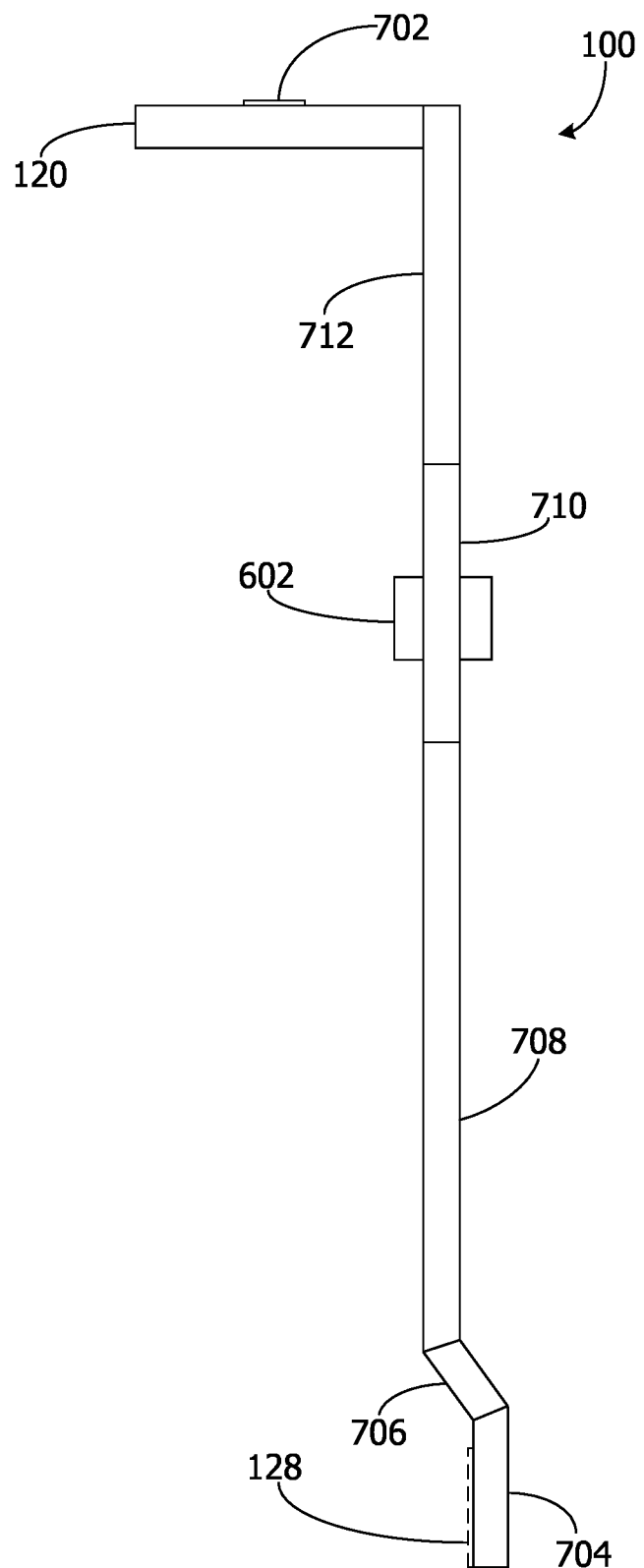
FIG. 7 is an exemplary block diagram illustrating an attachment frame including a light socket mounted on the support arm.

FIG. 7 is an exemplary block diagram illustrating an attachment frame 100 including a light socket mounted on the support arm 120. In this example, the attachment frame 100 includes a segment 704 of approximately six and a half inches long. A segment 706 is approximately three and a half inches long. A segment 708 is connected to a segment 710. A mounting plate 128 is connected to the bottom (last) segment at an end of the attachment frame opposite the support arm 120.

The support arm 120 is attached to an upper most segment 712 near the top end of the attachment frame 100. The support arm 120, in this example, includes the light socket 702 for supporting and providing electrical power to a light bulb when a light bulb is screwed into the socket. In this example, the light socket 702 is mounted to the support arm 120 via a fastener, such as, but not limited to, a set of bolts, a set of screws or other attachment device.

The attachment frame can optionally include a cup holder 602. The cup holder can be connected to any segment on the attachment frame. In this example, the cup holder is attached to a segment approximately midway on the main body so as to be within easy reach of a user loading or unloading cases on a conveyor device.

Figure 8:
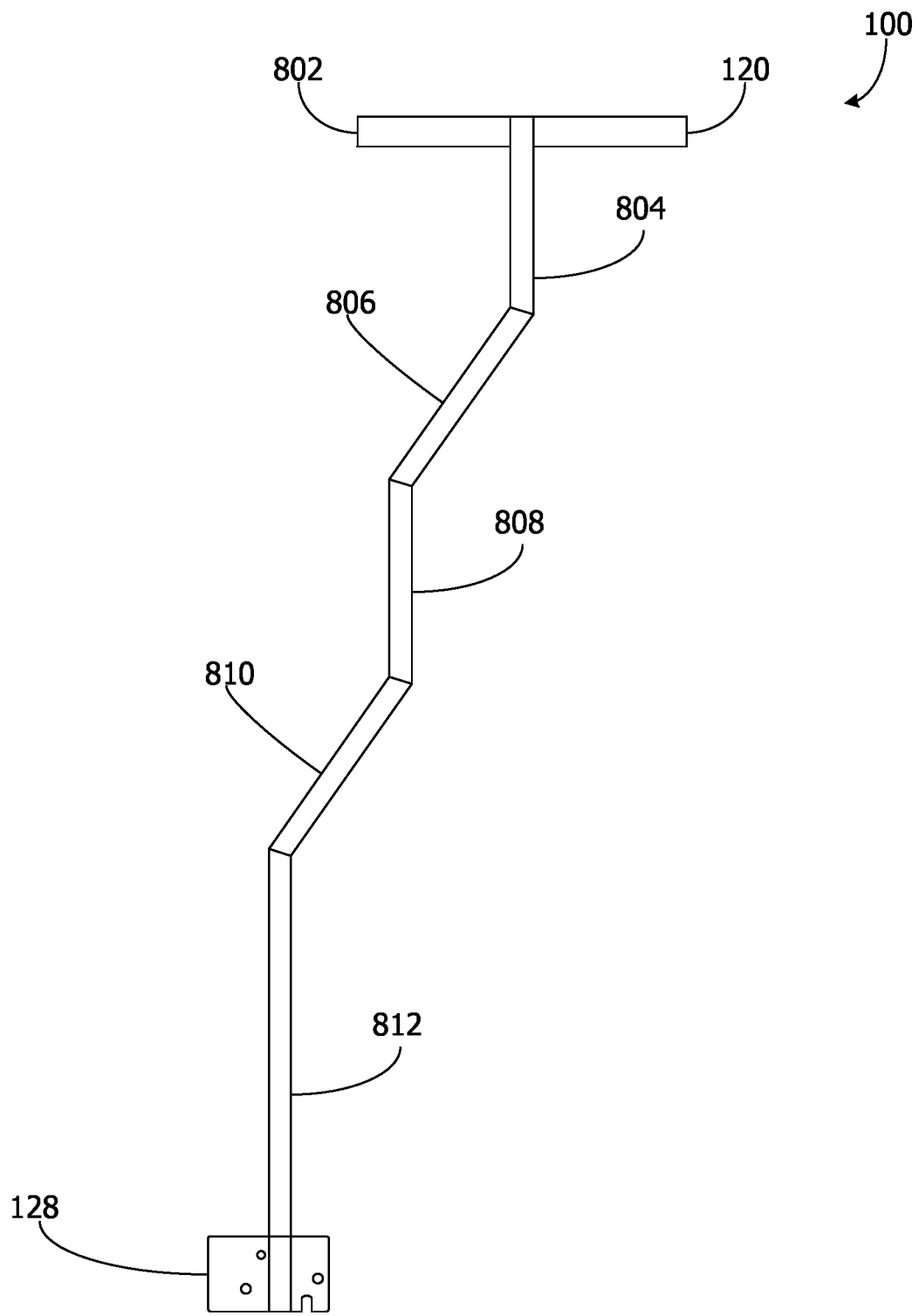
FIG. 8 is an exemplary block diagram illustrating an attachment frame including a set of support arms.

FIG. 8 is an exemplary block diagram illustrating an attachment frame 100 including a set of support arms. In this example, a first support arm 120 and a second support arm 802 are connected to a segment 804 closest to the top of the attachment frame 100. The pair of support arms enable additional lights and fans to be mounted on the frame. In this example, a set of lights can be attached to the support arm 120 and another set of lights can be attached to the second support arm 802. Likewise, a first fan can be mounted to the support arm 120 and a second fan can be mounted to the second support arm 802 to provide additional lighting or air circulation.

The attachment frame includes a plurality of segments. The plurality of segments in this example includes the segment 804 attached to a segment 806. The segment 806 is attached to the segment 804 and the segment 808. The segment 810 is connected to the segment 808 and the segment 812. The mounting plate 128, in this example, connects to the segment 812.

The attachment frame 100 in this example includes two support arms. The attachment frame in other examples includes a single support arm for supporting environmental control device(s). However, the examples are not limited to one or two support arms. In other examples, the attachment frame 100 can optionally include three support arms or any other appropriate number of support arms for supporting light(s) and/or fan(s) or other environmental control devices.

Figure 9:
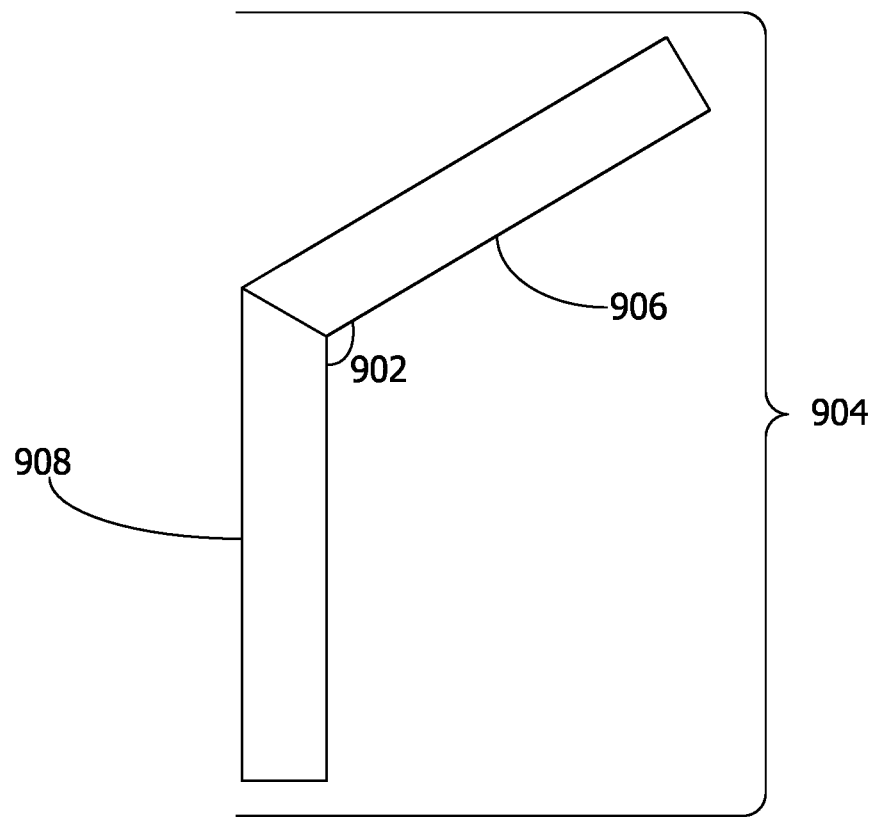
FIG. 9 is an exemplary block diagram illustrating an angle between a pair of segments.

FIG. 9 is an exemplary block diagram illustrating an angle 902 between a pair of segments 904. In some examples, the angle 902 between segment 906 and segment 908 is within a range from approximately twenty-eight degrees to thirty-two degrees. In this example, the angle 902 is thirty point six (30.6) degrees.

Figure 10:
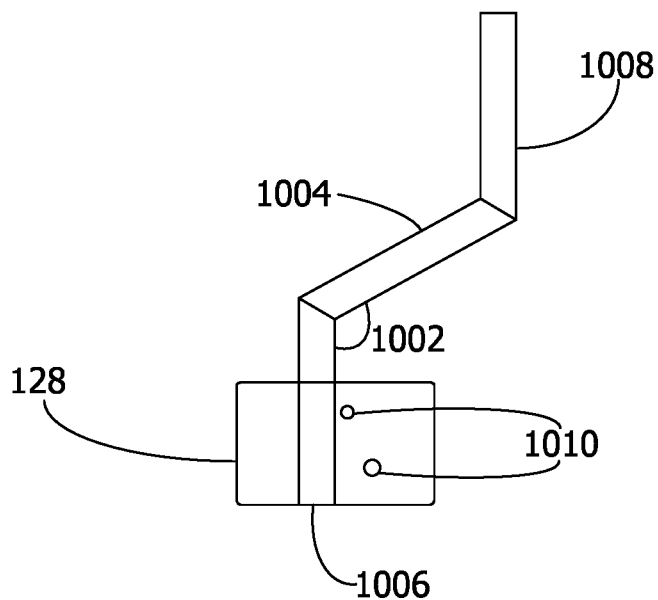
FIG. 10 is an exemplary block diagram illustrating an angle between a pair of segments associated with the mounting plate.

FIG. 10 is an exemplary block diagram illustrating an angle 1002 between a pair of segments associated with the mounting plate 128. In some examples, the angle 1002 between segment 1004 and segment 1006 connected to the mounting plate 128 is within a range from twenty-five degrees to thirty degrees. In this example, the angle 1002 is twenty-eight point seven (28.7) degrees. The segment 1006 and the segment 1008 in some examples are substantially vertical segments.

The mounting plate attaches to a portion of a piece of equipment, such as a trailer conveyance device, via a set of one or more fasteners 1010. The mounting plate in this example is permanently affixed to the segment 1006. The mounting plate removably attaches to the piece of equipment via the fasteners.

Figure 11:
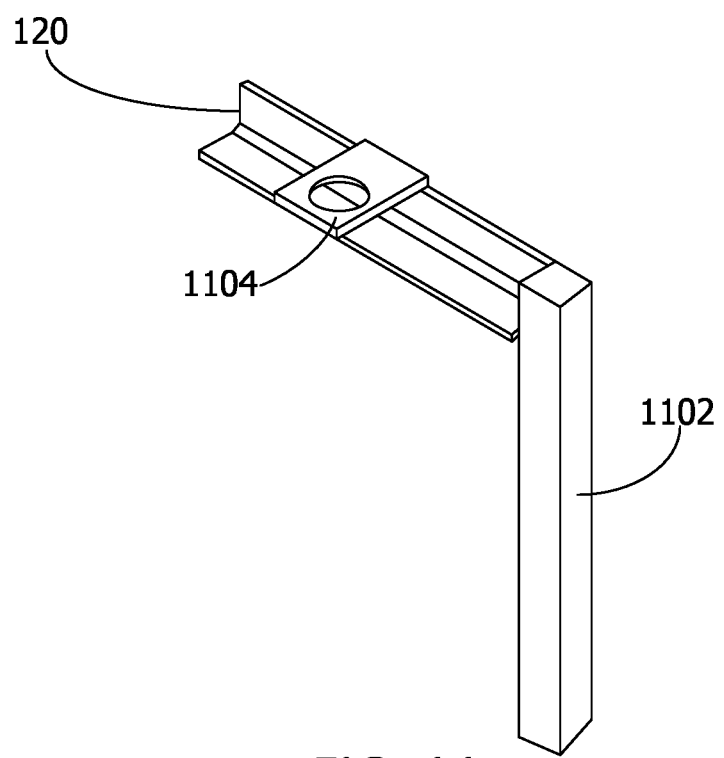
FIG. 11 is an exemplary block diagram illustrating a support arm connected to a segment of the main body of the attachment frame.

FIG. 11 is an exemplary block diagram illustrating a support arm 120 connected to a segment 1102 of the main body of the attachment frame. The support arm 120, in this non-limiting example, includes a mounting plate 1104 for providing additional support for one or more illumination devices, such as, but not limited to, a light socket. The mounting plate 1104 is a plate such as, but not limited to, the mounting plate 128 in FIG. 1.

Figure 12:
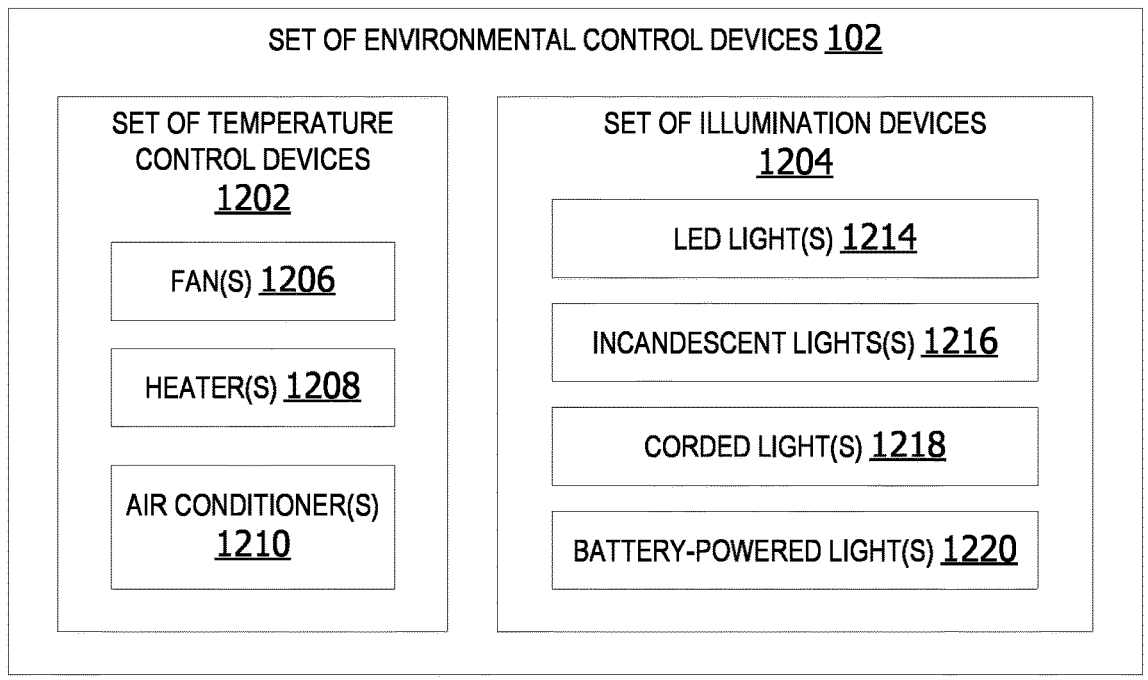
FIG. 12 is an exemplary block diagram illustrating a set of environmental control devices mountable on the attachment frame.

FIG. 12 is an exemplary block diagram illustrating a set of environmental control devices 102 mountable on the attachment frame. The set of environmental control devices 102, in some examples, includes a set of one or more temperature control devices 1202 and/or a set of one or more illumination device(s) 1204.

The set of temperature control devices 1202 can include one or more fan(s) 1206, such as, but not limited to, the 414 in FIG. 4. The set of temperature control devices 1202 can also include one or more portable heater(s) 1208, such as, but not limited to, the heater 416 in FIG. 4. The set of temperature control devices 1202 can also include one or more air conditioner(s) 1210.

The set of illumination devices 1204 can include one or more LED light(s) 1214 and/or one or more incandescent light(s) 1216. The set of illumination devices 1204 can also optionally include one or more corded light(s) 1218 and/or one or more battery powered light(s) 1220.

Figure 13:
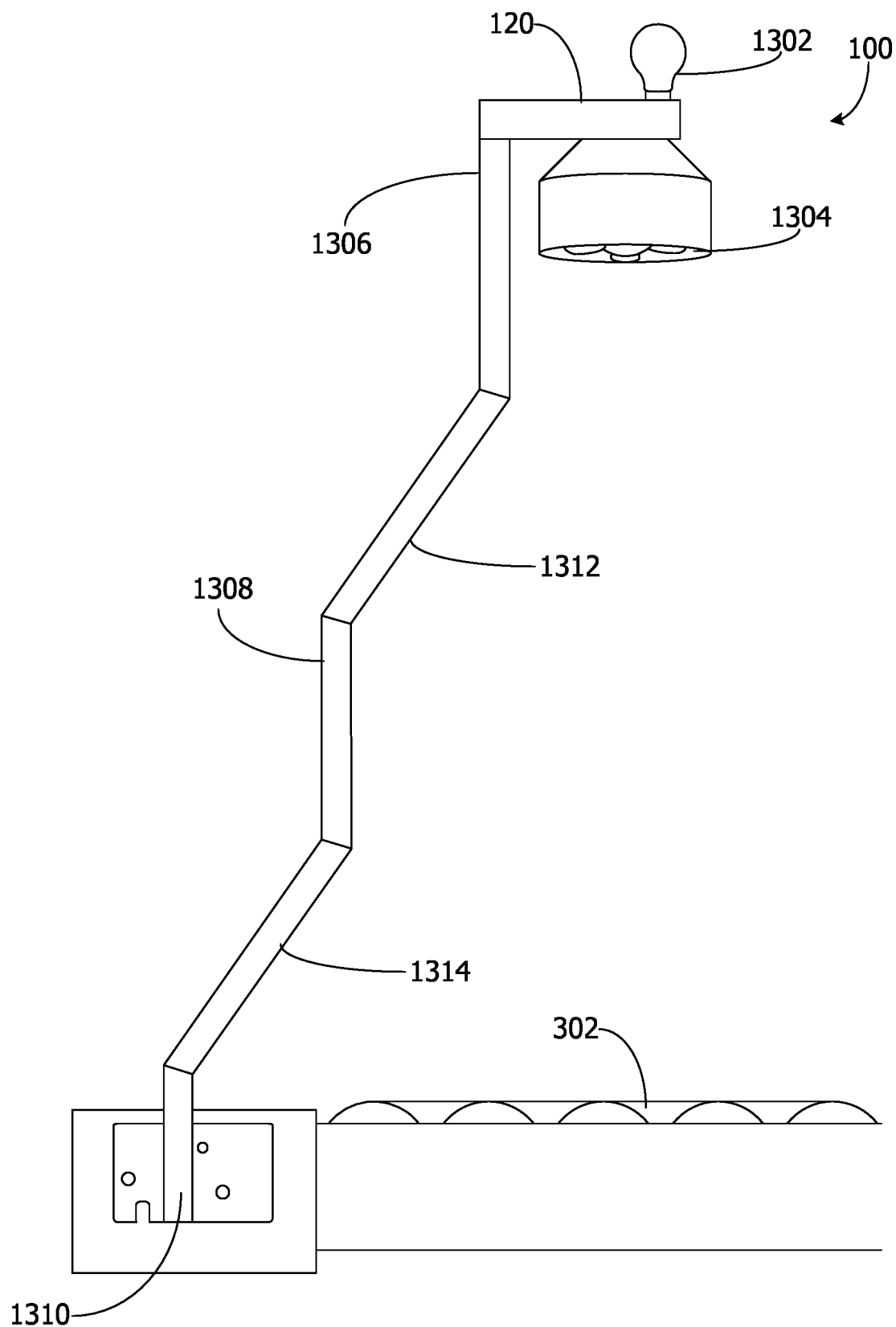
FIG. 13 is an exemplary block diagram illustrating an attachment frame mounted to a trailer conveyance device.

FIG. 13 is an exemplary block diagram illustrating an attachment frame 100 mounted to a trailer conveyance device 302. In this example, an LED light 1302 and a fan 1304 are mounted to the support arm 120 above the trailer conveyance device 302. The LED light 1302 provides lighting and illuminates the work area associated with the trailer conveyance device 302. The fan 1304 circulates air to provide additional ventilation and cooling within the work area without impeding users or reducing the amount of available work area.

In some examples, the attachment frame includes some vertical (straight) segments and some segments bent at an acute angle. In this example, the segments 1306, 1308 and 1310 are vertical segments. The segments 1312 and 1314 are bent at an angle. The mounting plate 1316, in this example, attaches to a side of the trailer conveyance device 302. The mounting plate 1316 is a plate such as, but not limited to, the mounting plate 128 in FIG. 1 and/or the mounting plate 1104 in FIG. 1.

The attachment frame 100, in this non-limiting example, includes a single fan mounted to an underside of the support arm 120. However, the examples are not limited to a single fan mounted to the support arm. In other examples, the support arm can include no mounted fans, as well as two or more fans mounted to the attachment frame 100. Likewise, the one or more fans can be mounted to the upper side of the support arm in other examples.

The attachment frame 100, in this non-limiting example, includes a single light mounted to an upper surface of the support arm. However, the examples are not limited to a single light mounted to the frame. In other examples, no lights are mounted to the support arm. In sill other examples, two or more lights are mounted to the support arm.

The light in this example is mounted to an end of the support arm opposite the main body of the attachment frame. However, the examples are not limited to a light mounted the light at the end of the support arm. In other examples, the light can be mounted substantially in the middle of the support arm, near the end of the support arm proximate the main body, at the tip of the support arm, on the underside of the support arm, or any other location on the support arm.

Figure 14:
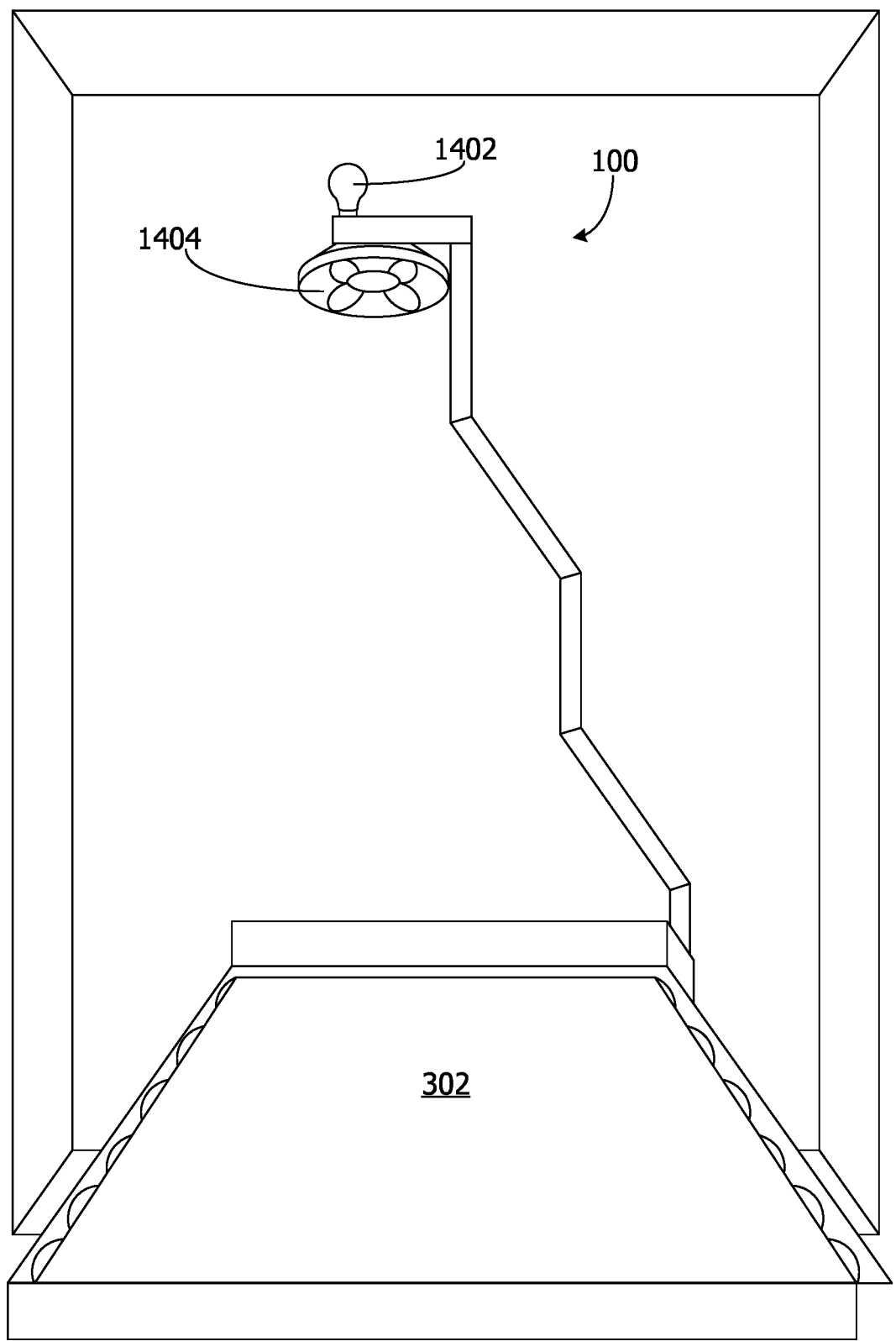
FIG. 14 is an exemplary block diagram illustrating an attachment frame including a mounted light and fan.

FIG. 14 is an exemplary block diagram illustrating an attachment frame 100 including a mounted light 1402 and fan 1404. The attachment frame supports the light 1402 and fan 1404 above the trailer conveyance device 302.

The light 1402 in this example is an LED light. In other examples, the light 1402 is implemented as a fluorescent light bulb, an incandescent light bulb, mercury lamp, halogen lamp or any other type of light.

The fan 1404, shown in this example, is a four bladed fan having an electric motor. However, the examples are not limited to four-bladed fans. In other examples, the fan 1404 is implemented as a fan having three-blades, five-blades, or any other number of blades.

The light and fan, in this example, are corded devices which can be plugged into an electrical outlet for power supply. In other non-limiting examples, the light and/or fan can be a cordless, battery-powered device.

Figure 15:
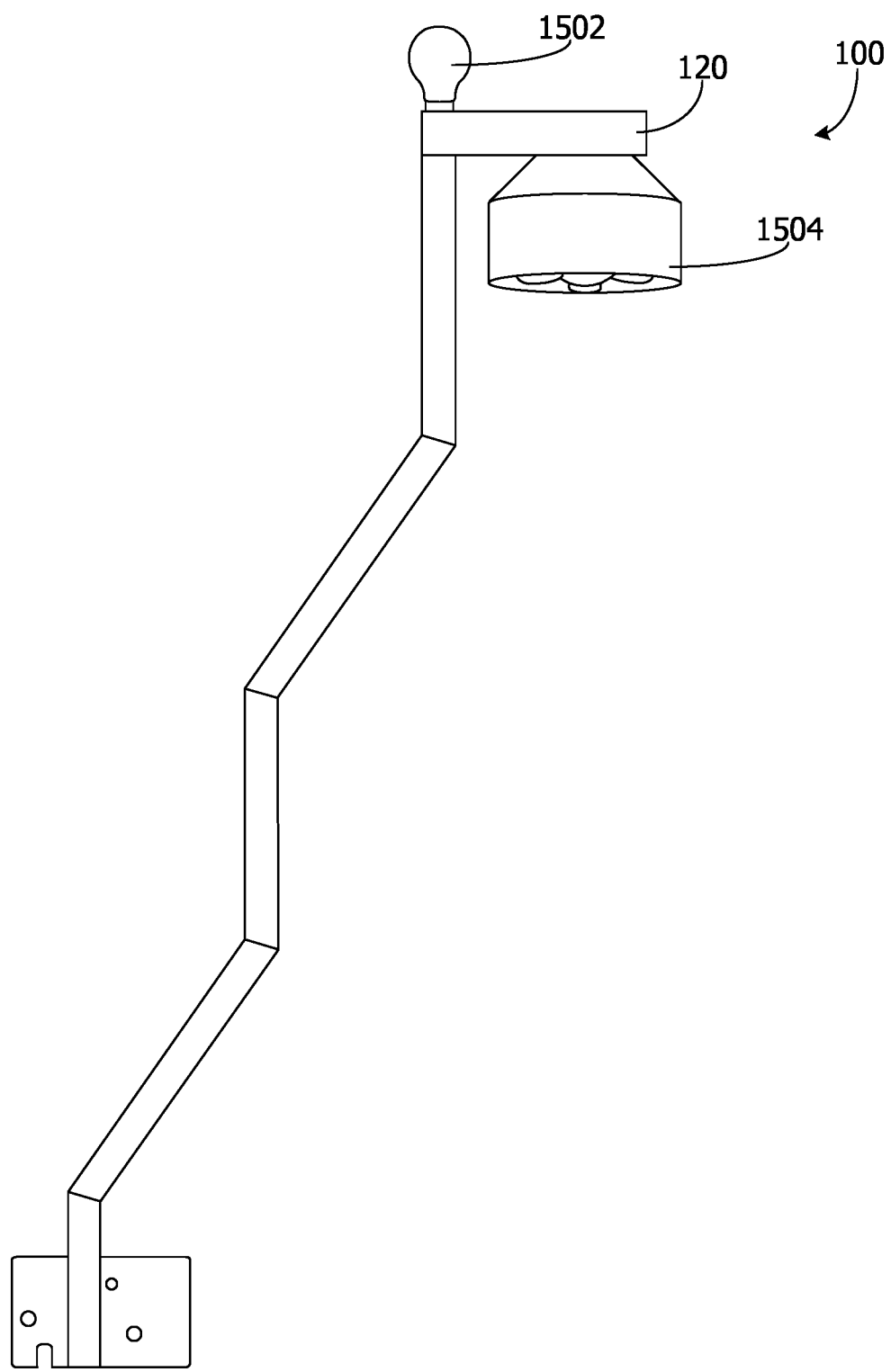
FIG. 15 is an exemplary block diagram illustrating an attachment frame having a combination light and fan mounted to a top portion of the support arm.

FIG. 15 is an exemplary block diagram illustrating an attachment frame 100 having a combination light 1502 and fan 1504 mounted to a top portion of the support arm 120. In this example, the light is attached to the support arm proximate to the end of the main body. The fan 1504 is attached to the support arm such that the fan 1504 hands down below the support arm.

In some examples, the attachment frame is a solid frame. The light 1502 and fan 1504 are corded, electric powered devices which can be plugged into a power outlet. The electric cords for the light and/or fan attach to one or more brackets along the main body to prevent the cords from becoming entangled or getting in the way of the user.

In other non-limiting examples, the main body of the attachment frame is substantially hollow. In these examples, the electric cords for the one or more light(s) and/or the one or more fan(s) or other environmental control devices mounted to the attachment frame are threaded through the hollow interior of the attachment frame. The electric cords run through the attachment frame to prevent the cords from becoming tangled or obstructing the user's work area associated with the trailer loader.

Figure 16:
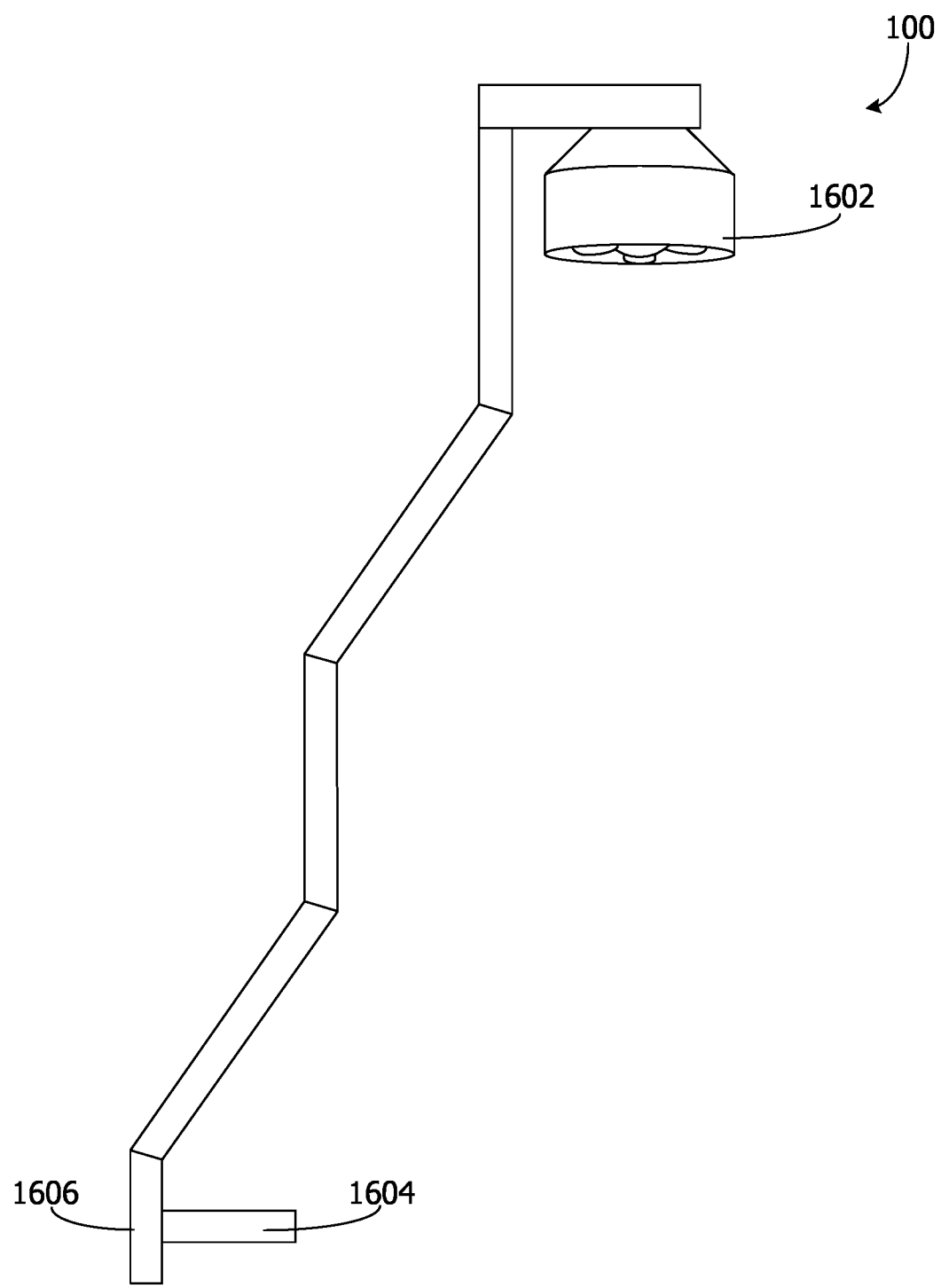
FIG. 16 is an exemplary block diagram illustrating a fan mounted to an attachment frame.

FIG. 16 is an exemplary block diagram illustrating a fan 1602 mounted to an attachment frame 100. The attachment frame 100, in this example. does not include a light mounted to the attachment frame. The attachment frame 100 in this non-limiting example includes an optional support member 1604. The support member 1604 rests on a member of the trailer conveyance device to provide additional support and stability to the attachment frame.

Figure 17:
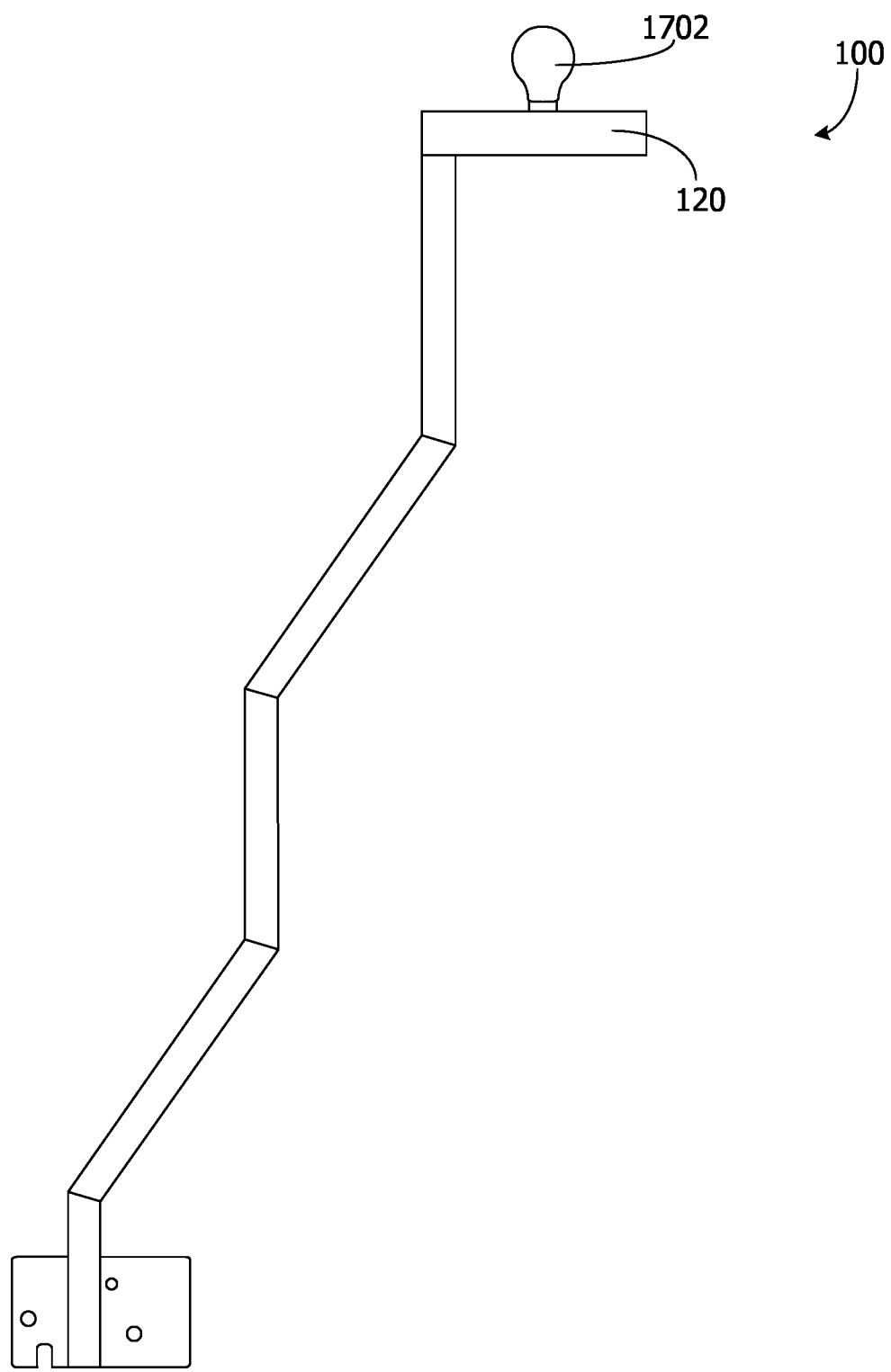
FIG. 17 is an exemplary block diagram illustrating a light mounted to an attachment frame.

FIG. 17 is an exemplary block diagram illustrating a light 1702 mounted to an attachment frame 100. The attachment frame 100, in this non-limiting example, does not include a fan or other temperature control device.

Figure 18:
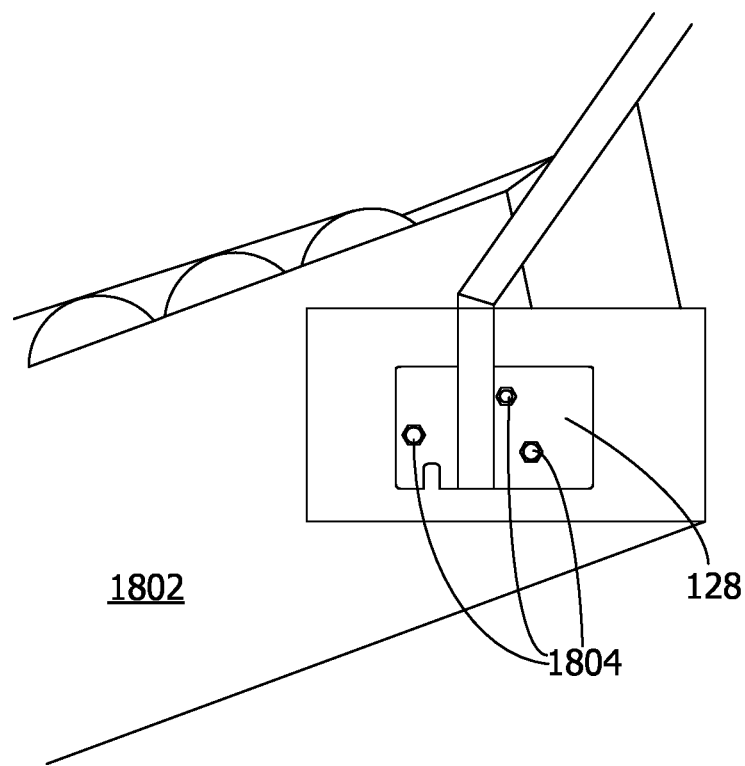
FIG. 18 is an exemplary block diagram illustrating a mounting plate mounted to a piece of equipment via a set of fasteners.

FIG. 18 is an exemplary block diagram illustrating a mounting plate 128 mounted to a piece of equipment 1802 via a set of fasteners 1804. The equipment 1802, in this example, can be equipment such as, but not limited to, the equipment 202 in FIG. 2 or the trailer conveyance device 302 in FIG. 3. The set of fasteners 1804, in this example, is a set of bolts securing the mounting plate to a portion of the equipment. In other examples, the set of fasteners 1804 can be implemented as a set of screws, pins, rivets, or any other type of fasteners for securing the mounting plate to the equipment 1802.

The examples are not limited to the mounting bracket shown in FIG. 18. In other examples, the mounting plate can have a different size, shape, or configuration to accommodate other types of conveyors and conveyor equipment.

Figure 19:
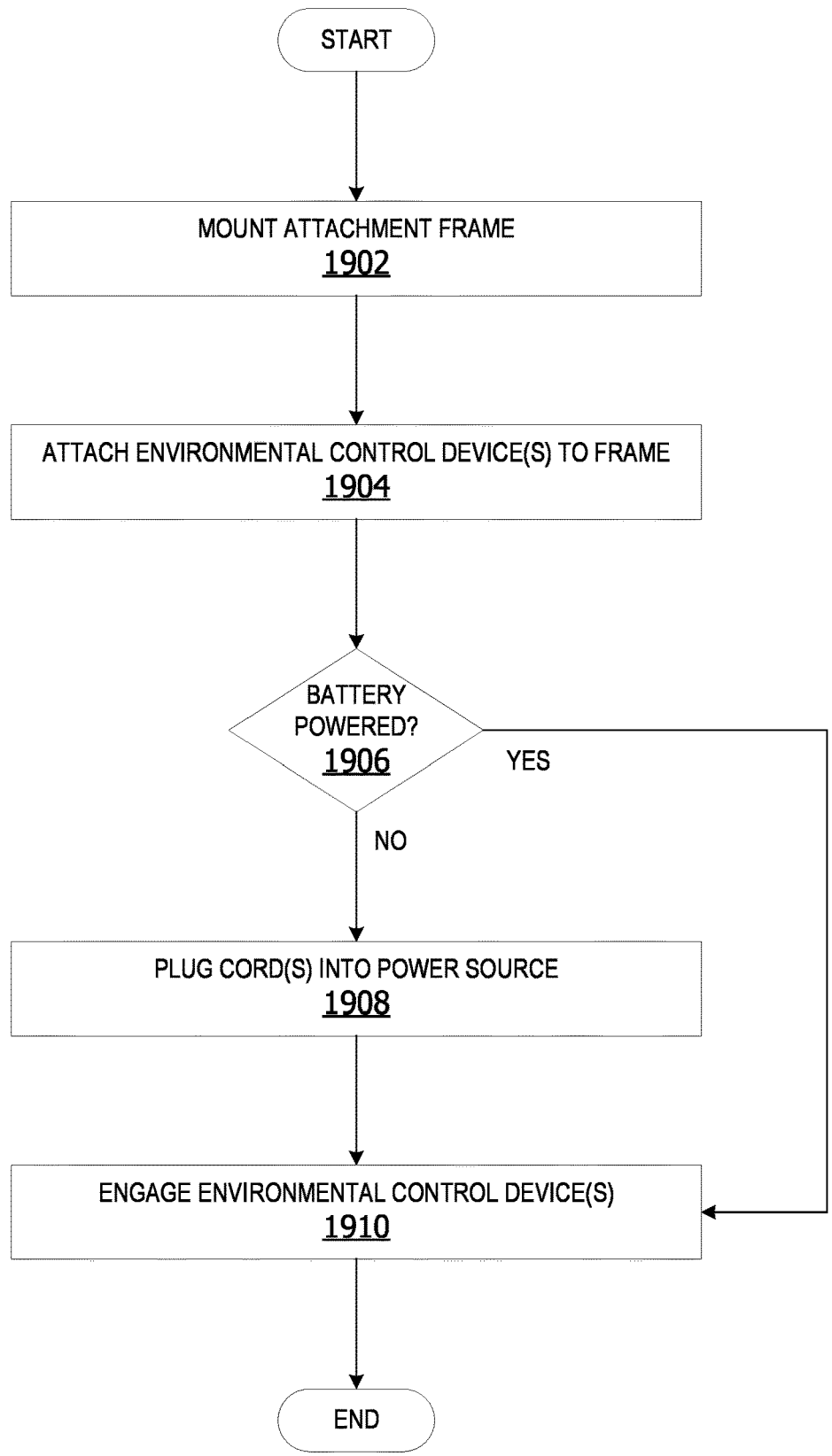
FIG. 19 is an exemplary flow chart illustrating utilization of an attachment frame for mounting a combination of environmental control devices.

FIG. 19 is an exemplary flow chart 1900 illustrating utilization of an attachment frame for mounting a combination of environmental control devices. The process begins by mounting the attachment frame to a member of a piece of equipment at 1902. The piece of equipment can include, without limitation, a device such as the trailer conveyance device 302 in FIG. 3. A set of environment control devices removably attach to at least a portion of the support arm on the attachment frame at 1904. A determination is made whether the environmental control device is battery powered at 1906. If no, the electrical cords for the device are plugged into a power source at 1908. In some examples, the power source is associated with the trailer conveyance device, such as, but not limited to, the power source 210 in FIG. 2. The environmental control device(s) are engaged to turn them on. The process terminates thereafter.

Additional Examples

In some examples, an attachment frame for mounting a fan and light to a conveyor or other equipment consists of non-articulating, fixed segments that bend at various angles. A support arm has an "L" shaped mounting member at its top that facilitates mounting of the fan and light. A mounting bracket attaches a vertical segment of the attachment frame to the conveyor or other equipment.

In other examples, the attachment frame consists of a long "L" shaped bracket on a support arm. The attachment frame mounts on the end of a trailer loader device. The bracket supports a fan and light which may be positioned to suit the loader. Power for the unit, in some examples, includes one hundred and twenty (120) volts of alternating current (AC). The power may be provided by the trailer, the trailer loader device, or any other source of electric power.

In an example scenario, a first ship lane without the attachment frame measured a heat index of 100 with lighting at thirty-nine (0.39) foot candles with currently available lighting. In this non-limiting example scenario, a second ship lane without the attachment frame measured a heat index of ninety-nine (99) with lighting similar to the first ship lane. In a third ship lane utilizing the attachment frame with the new fan and lighting, measurements showed a lower head index of 94 with lighting at seventeen and a half (17.5) foot candles. Thus, the attachment frame with attached fan and light(s) provides a significant increase in lighting and reduction in heat index.

Alternatively, or in addition to the other examples described herein, examples include any combination of the following:

a top surface of the support arm configured to removably mount an illumination device above the trailer conveyance device;

a bottom surface of the support arm configured to removably mount a temperature control device, wherein the temperature control device comprises at least one of a fan or a heater;

a mounting member associated with the support arm configured to removably attach at least one environmental control device to the attachment frame, wherein the mounting member comprises at least one of a clamp, a clip, a bracket, a bolt, a pin, or a screw;

wherein at least one environmental control device comprises a fan, a heater, an air conditioner, or a set of lights;

at least one light-emitting diode (LED) light socket mounted to a top surface of the support arm;

a set of fasteners removably attaching the mounting plate to at least a portion of the trailer conveyor device, wherein the set of fasteners comprises at least one of a set of screws or a set of bolts, wherein the second segment of the main body is at least partially welded to the mounting plate;

a container support clamp connected to a third segment of the main body configured to support a container for storing liquid;

wherein an angle between a pair of segments is within a range from approximately twenty-eight degrees to thirty-two degrees, wherein the pair of segments comprises a third segment attached to the container support clamp and a fourth segment;

wherein an angle between a pair of segments including the second segment attached to the mounting plate and a next segment attached to the second segment is within a range from twenty-five degrees to thirty degrees;

mounting the attachment frame to a member of a trailer conveyance device via a mounting plate, the attachment frame comprising a plurality of non-articulating segments bending at a set of angles and a support arm substantially perpendicular to a top surface of the trailer conveyance device;

attaching a set of environment control devices to at least a portion of the support arm, the support arm connected to a first segment in the plurality of non-articulating segments associated with a first end of a main body of the attachment frame;

engaging at least one environmental control device to improve environmental conditions within an interior of a trailer during loading or unloading a set of items into an interior compartment within a trailer;

wherein improving environmental conditions comprises at least one of lowering an internal temperature within the interior of the trailer, increasing air circulation, or increasing a number of foot candles of light within the interior of the trailer.

providing power to at least one environmental control device in the set of environmental control devices via a power source associated with the trailer conveyance device;

securing a water bottle to a portion of the attachment frame via a container support clamp connected to a third segment of the main body configured to support a container for storing liquid;

attaching at least one environmental control device to at least a portion of the support arm via a mounting member;

a top surface of the support arm configured to removably mount an illumination device; and a bottom surface of the support arm configured to removably mount a temperature control device.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for combination attachment of a set of environmental control devices via an attachment frame, the system comprising:
    a main body comprising a plurality of non-articulating segments bending at a set of angles, the set of angles comprising an angle between each pair of segments within the main body;
    a support arm substantially perpendicular to the main body configured to support a set of environment control devices, the support arm connected to a first segment in the plurality of non-articulating segments associated with a first end of the main body; and
    a mounting plate connected to a second segment in the plurality of non-articulating segments associated with a second end of the main body configured to mount the attachment frame to at least a portion of equipment within a work area.

2. The system of claim 1, further comprising:
    a top surface of the support arm configured to removably mount an illumination device within the work area.

3. The system of claim 1, further comprising:
    a bottom surface of the support arm configured to removably mount a temperature control device, wherein the temperature control device comprises at least one of a fan or a heater.

4. The system of claim 1, further comprising:
    a mounting member associated with the support arm configured to removably attach an environmental control device to the attachment frame, wherein the mounting member comprises at least one of a clamp, a clip, a bracket, a bolt, a pin, or a screw.

5. The system of claim 4, wherein the environmental control device comprises at least one of a fan, a heater, an air conditioner, or a set of lights.

6. The system of claim 1, further comprising:
    at least one light-emitting diode (LED) light socket mounted to a top surface of the support arm.

7. The system of claim 1, further comprising:
    a set of fasteners comprising at least one of a set of screws or a set of bolts, wherein the second segment of the main body is at least partially welded to the mounting plate.

8. The system of claim 1, further comprising:
    a container holder connected to a third segment of the main body configured to support a container for storing liquid.

9. The system of claim 8, wherein an angle between a pair of segments is within a range from approximately twenty-eight degrees to thirty-two degrees, wherein the pair of segments comprises a third segment attached to the container holder and a fourth segment.

10. The system of claim 1, wherein an angle between a pair of segments including the second segment attached to the mounting plate and a next segment attached to the second segment is within a range from twenty-five degrees to thirty degrees.

11. A method for combination attachment of a set of environmental control devices via an attachment frame, the method comprising:

mounting the attachment frame to a member of a trailer conveyance device via a mounting plate, the attachment frame comprising a plurality of non-articulating segments bending at a set of angles and a support arm substantially perpendicular to a top surface of the trailer conveyance device;

attaching a set of environment control devices to at least a portion of the support arm, the support arm connected to a first segment in the plurality of non-articulating segments associated with a first end of a main body of the attachment frame; and engaging an environmental control device within an interior of a trailer during loading or unloading a set of items into an interior compartment within a trailer.

12. The method of claim 11, wherein the environmental control device comprises at least one of a fan, a heater, an air conditioner, or a light.

13. The method of claim 11, further comprising:
providing power to the environmental control device via a power source associated with the trailer conveyance device.

14. The method of claim 11, further comprising:
securing a water bottle to a portion of the attachment frame via a container holder connected to a third segment of the main body configured to support a container for storing liquid.

15. The method of claim 11, wherein removably attaching the environmental control device further comprises attaching the at least a portion of the environmental control device to at least a portion of the support arm via a mounting member.

16. An attachment frame for combination attachment of a set of environmental control devices to a trailer conveyance device, the attachment frame comprising:
a main body comprising a plurality of non-articulating segments bending at a set of angles, the set of angles comprising an angle between each pair of segments within the main body;

a support arm substantially perpendicular to the main body configured to support a set of environment control devices, the support arm connected to a first segment in the plurality of non-articulating segments associated with a first end of the main body;

a container holder connected to a third segment of the main body configured to support a container for storing liquid; and a mounting plate connected to a second segment in the plurality of non-articulating segments associated with a second end of the main body configured to mount the attachment frame to a trailer conveyor device for loading or unloading a set of items within an interior of a trailer.

17. The attachment frame of claim 16, further comprising:
a top surface of the support arm configured to removably mount an illumination device; and
a bottom surface of the support arm configured to removably mount a temperature control device.

18. The attachment frame of claim 16, further comprising:
a set of fasteners removably attaching the mounting plate to at least a portion of the trailer conveyor device, wherein the set of fasteners comprises at least one of a set of screws or a set of bolts, wherein the second segment of the main body is at least partially welded to the mounting plate.

19. The attachment frame of claim 16, wherein an angle between a pair of segments including a third segment attached to the container holder and a fourth segment is within a range from approximately twenty-eight degrees to thirty-two degrees.

20. The attachment frame of claim 16, wherein an angle between a pair of segments including the second segment attached to the mounting plate and a fourth segment attached to the second segment is within a range from twenty-five degrees to thirty degrees.

* * * * *